United States Patent
Przykucki, Jr. et al.

(10) Patent No.: US 12,071,193 B2
(45) Date of Patent: Aug. 27, 2024

(54) SYSTEM FOR BALANCING DAMPENING FORCES ON A SUSPENSION SYSTEM

(71) Applicant: Motion Instruments Inc., Redwood City, CA (US)

(72) Inventors: Robert James Przykucki, Jr., Redwood City, CA (US); Michael Chartier, Plymouth, MN (US)

(73) Assignee: Motion Instruments Inc., Redwood City, CA (US)

( * ) Notice: Subject to any disclaimer, the term of this patent is extended or adjusted under 35 U.S.C. 154(b) by 0 days.

(21) Appl. No.: 17/447,546

(22) Filed: Sep. 13, 2021

(65) Prior Publication Data
US 2022/0097792 A1 Mar. 31, 2022

Related U.S. Application Data

(63) Continuation of application No. 16/151,061, filed on Oct. 3, 2018, now Pat. No. 11,117,635.

(51) Int. Cl.
*B62J 99/00* (2020.01)
*B62K 25/00* (2006.01)
*G01S 19/42* (2010.01)
*B62J 45/20* (2020.01)
*B62J 45/40* (2020.01)
(Continued)

(52) U.S. Cl.
CPC .............. *B62J 99/00* (2013.01); *B62K 25/00* (2013.01); *G01S 19/42* (2013.01); *B62J 45/20* (2020.02); *B62J 45/40* (2020.02); *B62J 50/20* (2020.02); *G06T 11/206* (2013.01)

(58) Field of Classification Search
CPC ............ B62J 99/00; B62J 50/20; B62J 45/20; B62J 45/40; B62K 25/00; G01S 19/42; G06T 11/206
See application file for complete search history.

(56) References Cited

U.S. PATENT DOCUMENTS

| | | | |
|---|---|---|---|
| 4,376,387 A * | 3/1983 | Stevens ................. | G01M 17/04 |
| | | | 702/81 |
| 5,615,756 A | 4/1997 | Grundei et al. | |
| 8,838,335 B2 | 9/2014 | Galasso et al. | |

(Continued)

FOREIGN PATENT DOCUMENTS

| | | | | |
|---|---|---|---|---|
| EP | 2357098 | | 10/2014 | |
| EP | 3109144 | * | 5/2016 | ............. B60G 17/08 |

(Continued)

*Primary Examiner* — Jess Whittington
*Assistant Examiner* — Terry C Buse
(74) *Attorney, Agent, or Firm* — Knobbe, Martens, Olson & Bear, LLP

(57) ABSTRACT

A system for adjusting the damper force on the suspension system of a bicycle is provided. Sensors are placed on the front shock and rear shock to measure the amplitude of displacement or acceleration in the time domain and generate a zenith position, velocity, force, and work based on the measured values. The system calculates a curve fit approximation curve for the relationships of zenith position versus velocity and uses the approximation curves to generate and display recommended damper settings for the front shock and rear shock. Using the data ensures that the bicycle suspension data is balanced, such that the front shock and rear shock respond similarly to the same event.

19 Claims, 12 Drawing Sheets

(51) Int. Cl.
*B62J 50/20* (2020.01)
*G06T 11/20* (2006.01)

(56) References Cited

U.S. PATENT DOCUMENTS

| | | |
|---|---|---|
| 9,108,098 B2 | 8/2015 | Galasso et al. |
| 9,278,598 B2 | 3/2016 | Galasso et al. |
| 9,422,018 B2 | 8/2016 | Pelot et al. |
| 9,452,654 B2 | 9/2016 | Ericksen et al. |
| 10,036,443 B2 | 7/2018 | Galasso et al. |
| 10,047,817 B2 | 8/2018 | Ericksen et al. |
| 10,099,743 B2 | 10/2018 | Walthert et al. |
| 10,416,186 B2 | 9/2019 | Nichols et al. |
| 10,537,790 B2 | 1/2020 | Galasso et al. |
| 10,737,546 B2 | 8/2020 | Tong |
| 10,807,670 B2 | 10/2020 | Krugman et al. |
| 10,933,710 B2 | 3/2021 | Tong |
| 10,982,751 B2 | 4/2021 | Wesling |
| 11,021,214 B2 | 6/2021 | Ho |
| 2003/0160369 A1 | 8/2003 | LaPlante |
| 2014/0316652 A1 | 10/2014 | Ericksen et al. |
| 2015/0183440 A1 | 7/2015 | Jackson |
| 2015/0317065 A1 | 11/2015 | Meriaz et al. |
| 2016/0339989 A1* | 11/2016 | Walthert .................. F16F 9/06 |
| 2018/0297435 A1 | 10/2018 | Brady et al. |
| 2018/0304952 A1 | 10/2018 | Krugman et al. |
| 2019/0092421 A1 | 3/2019 | Nichols |
| 2019/0184782 A1 | 6/2019 | Shaw |
| 2019/0203798 A1 | 7/2019 | Cox et al. |
| 2019/0232748 A1* | 8/2019 | Mohamed .......... B60G 17/0165 |
| 2020/0166089 A1 | 5/2020 | Choltco-devlin et al. |
| 2020/0269647 A1 | 8/2020 | Strickland et al. |
| 2020/0357300 A1 | 11/2020 | Galasso et al. |
| 2021/0061405 A1 | 3/2021 | Ericksen et al. |
| 2021/0065467 A1 | 3/2021 | Allinger et al. |
| 2021/0088100 A1 | 3/2021 | Woelfel |
| 2021/0155313 A1 | 5/2021 | Ericksen et al. |
| 2021/0179222 A1 | 6/2021 | Santurbane et al. |
| 2021/0179226 A1 | 6/2021 | Santurbane et al. |
| 2021/0268857 A1 | 9/2021 | D'orazio et al. |
| 2021/0300140 A1 | 9/2021 | Ericksen et al. |
| 2021/0309063 A1 | 10/2021 | Negishi et al. |
| 2021/0317891 A1 | 10/2021 | Gilbert et al. |
| 2021/0331550 A1 | 10/2021 | Schoolcraft, Jr. et al. |

FOREIGN PATENT DOCUMENTS

| | | | |
|---|---|---|---|
| EP | 3075581 | 10/2016 | |
| EP | 3109144 | * 12/2016 | ............. B60G 17/08 |
| KR | 10-2009-0117921 | 11/2009 | |

* cited by examiner

SYSTEM FOR BALANCING DAMPENING FORCES ON A SUSPENSION SYSTEM

RELATED APPLICATIONS

This application is a continuation of U.S. patent application Ser. No. 16/151,061, filed Oct. 3, 2018, entitled "SYSTEM FOR BALANCING DAMPENING FORCES ON A SUSPENSION SYSTEM;" the entirety of which is incorporated herein by reference.

BACKGROUND OF THE INVENTION

The present invention relates generally to the field of telemetry data for multi-wheel suspension. The present invention relates specifically to a system to balance a suspension system based on actual suspension performance data. Multi-wheel suspension systems have at least two different adjustable dampers and may have up to 200,000 different combinations of settings for each damper. It is desired to use actual data to fine-tune those settings in order to enhance the overall performance of the bike suspension system.

SUMMARY OF THE INVENTION

One embodiment of the invention relates to a system for adjusting a damping force on the suspension of a bicycle. The system includes a linear position sensor coupled to a front shock of a bicycle to generate a vertical fork deflection signal representative of the vertical deflection of the front shock. The system includes another sensor coupled to a rear shock of a bicycle to precisely measure the position of the rear shock. A processor is coupled to the sensors. The processor generates front shock and rear shock velocity data representative of a vertical component of velocity of the front shock and rear shock based upon the signals. The processor generates front shock and rear shock acceleration data representative of the vertical acceleration of the front shock and rear shock based upon the signals. The processor generates zenith position data for the front shock and rear shock representative of a vertical zenith position based on the front shock and rear shock acceleration data, and generates an approximation curve video signal based upon the velocity data and zenith position data for the front shock and rear shock. A display is coupled to the processor and configured to generate a visual representation of the velocity to zenith position based upon the approximation curve video signal computed for the front shock and the rear shock. The visual representation includes a curve fit analysis of the velocity data versus zenith position data for the front shock and the rear shock. Adjustments to the damping force of the front shock and rear shock are based upon the curve fit analysis.

Another embodiment of the invention relates to a system for adjusting a damping force on a suspension of a bicycle. The system includes a front shock sensor coupled to a front shock of a bicycle to generate a vertical fork acceleration signal representative of the vertical acceleration of the front shock. A rear shock sensor is coupled to a rear shock of a bicycle to generate a vertical rear acceleration signal representative of the vertical acceleration of the rear shock. A processor is coupled to the sensors. The processor generates front shock and rear shock velocity data representative of a vertical component of velocity of the front shock and rear shock based upon the signals. The processor can generate zenith position data for the front shock and rear shock based on the acceleration signal representative of the vertical acceleration of the front shock and rear shock, and generates an approximation curve video signal based upon the velocity and zenith position data. A display is coupled to the processor and configured to simultaneously generate a visual representation of the velocity to zenith position based upon the approximation curve video signals computed for the front shock and rear shock. The visual representation includes a curve fit analysis of the vertical component of velocity versus zenith position of the front shock and the rear shock. The display recommends adjustments to the damping force at the front shock and rear shock based upon the curve fit analysis.

Another embodiment of the invention relates to a device for displaying parameters of a suspension system for a bicycle. Electronic memory stores user inputs and result data for a front shock and a rear shock. A setup module obtains information related to the front shock and the rear shock on a suspension system of the bicycle. The setup module includes a front shock module and a rear shock module. The front shock module obtains a calibrated vertical displacement of the front shock and stores a head tube angle of the front shock. The rear shock module obtains a calibrated vertical displacement of the rear shock and stores a rear shock angle of the rear shock. A record module records events during a ride. The record module obtains the vertical displacement, velocity, and acceleration of the front shock and rear shock for each event and stores the vertical displacement, velocity, and acceleration of the front shock and the rear shock in electronic memory. A results module accesses the results of the record module and setup module to calculate the vertical force and vertical work components for each event at the front shock and rear shock. The results module generates a curve fit analysis of the vertical zenith position component versus velocity for the front shock and rear shock. The results module compares the curve fit analysis for the zenith position and velocity components at the front shock with the curve fit analysis for the zenith position and velocity components at the rear shock. Adjustments for the front shock and the rear shock are based on the comparison of the curve fit analysis for zenith position and velocity components of the front shock and the rear shock.

Alternative exemplary embodiments relate to other features and combinations of features as may be generally recited in the claims.

BRIEF DESCRIPTION OF THE DRAWINGS

This system will become more fully understood from the following detailed description, taken in conjunction with the accompanying figures, wherein like reference numerals refer to like elements in which.

DETAILED DESCRIPTION

Figure 1:
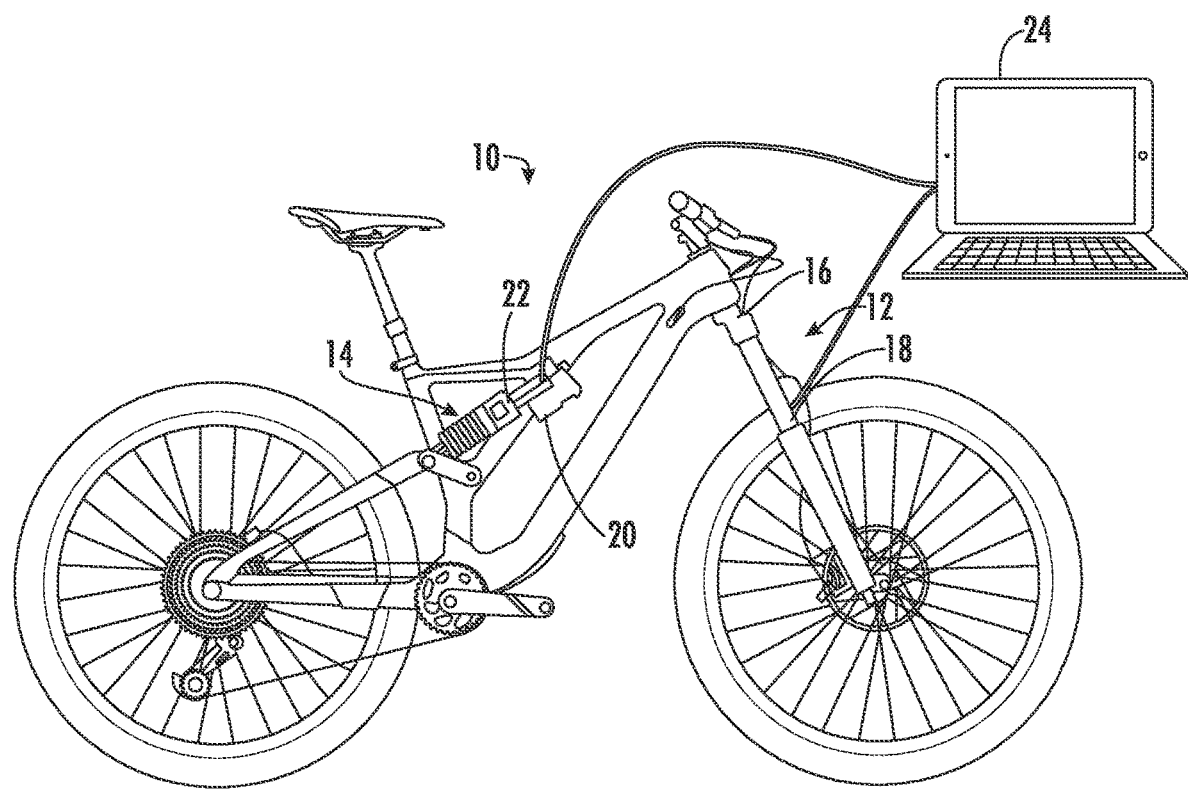
FIG. 1 illustrates a system for measuring the deflection, velocity, and acceleration of a multi-wheeled suspension system to calibrate the suspension system, according to an exemplary embodiment.

Referring generally to the figures, various embodiments of a system 10 to adjust a dampening force on a suspension system of a bicycle are shown. Many of today's bicycles use shock absorption to improve the riding experience, enhance traction on slopes or slippery terrain, and/or reduce the force distributed to the rider's wrists or body. Sensors on the shock absorbers measure the deflection of the shock absorbers. With this data, system 10 can determine the zenith position, velocity of the deflection, the acceleration, and the forces distributed to the front shock (or "fork") and rear shock (or "shock"). The speed of compression or rebound, as well as the absolute force/work of the deflection and rebound, are important balance metrics that determine how the suspension system is performing. Sensors may capture and collect raw deflection and/or acceleration data and communicate the data through telemetry to a smartphone or other device.

Obtaining shock absorption raw deflection data for a post-ride analysis is the first step to understand how a suspension system behaves. However, raw deflection data represents a multitude of events for a single ride. The deflection data represents a collection of instantaneous position samples for each deflection event in the time domain. Instantaneous position samples may be made along with a nine-axis accelerometer, gyro, and direction sensor based on the earth's magnetic field. The instantaneous position of a fork damper and shock absorber damper are sampled at a specified frequency. A method of turning this raw data into analytical results for improving the riding experience is sought that enables setting the parameters of the shock absorber according to the results of objective deflection data. By visualizing the results, a rider will "see" how the suspension system performs during actual events measured during a ride and how to adjust the suspension system to enhance performance.

Each damper on a bicycle should deflect a similar amount for each event. In addition, the speed of the deflection is also relevant. If the front and rear shocks both deflect equal distances but at different times, the rider experiences an imbalance. The ultimate goal in tuning damped suspension systems is to ensure that each damper behaves similarly. For motorcycles, bicycles, or other multi-wheeled vehicles, the balance between the front shock absorber and the rear shock absorber requires understanding the system as a whole, not just individual dampers. This requires comparing the shock absorber performance.

Typical dampers are adjustable to enable a rider to configure damper response to a force (e.g., an event). Some of the adjustments include compression, rebound, spring rate, spring progressivity, and other settings that an operator "tunes" on each damper. For example, compression and rebound adjustments typically include two different damper tuners for high and low-speed events. In all, a single damper can have 200,000 or more unique combinations. To understand the system as a whole, both the front and rear damper must be analyzed together. When paired with another damper, the combinations of settings can become unwieldy. Applicant has found that by taking the data of a ride and visualizing the results, an operator can tune the settings to achieve greater suspension balance.

A control process is sought so that an operator can tune the dampers as a system and achieve an enhanced riding experience based on the results. To better understand the dynamic forces of an event with multiple dampers, a system is sought to systematically inform the user on preferred settings based on actual riding events. Based on this control system, the operator should quickly "see" whether the system is balanced and make adjustments accordingly. Visualization of the data further ensures that each damper responds as part of a complete system according to unique bicycle characteristics and/or rider preferences. Applicant has found that by separating the data from the sensors into compression data and rebound data, and optionally further classifying the data by event type, the regression lines of the processed data provide a system to visualize suspension balance and make adjustments.

A data or curve fit such as a regression analysis can simplify a comprehensive scatter-plot of all events for analysis of particular data samples indicative of the vehicle's dynamic response. For example, a displacement versus velocity plot of each event creates a large scatter-plot of the front and rear shock performance. A regression analysis line enhances understanding through visual simplification of the results. Using a filter to organize scatter-plot data into collections of discrete events (e.g., left-hand turns, jumps, or vertical climbs, or rocky descents). This enables the system to analyze performance for each classification and ensure appropriate shock absorption settings for each event type.

The processor separates the data obtained from the time domain into compression events and rebound events. The processor can then perform a regression analysis for either the complete scatter-plot or a limited scatter-plot limited for a collection of discrete events. To visualize the damper balance, the processor classifies the events as a compression or rebound in the time domain. The real-time graph records compressions as upward movements and rebounds as downward movements. This data is converted to a scatter-plot for compression events and a scatter-plot for rebound events. The scatter-plot generates a velocity of the contraction or rebound along the y-axis, versus a total displacement on the x-axis for each event. Once the system plots the regression lines for the front shock and the rear shock, the user or system can compare the lines. The bike is tuned or balanced when the regression lines representing the rebound or compression of the front and rear shocks are parallel. In practice, perfectly parallel lines are seldom achieved, but the process gives a mechanism to visualize the performance of the suspension system and make improvements to the system based on data.

FIG. 1 illustrates a control system 10 for adjusting a dampening force on a suspension system 11. A front shock damper, or fork 12, and a rear shock damper, or shock 14, are illustrated. The fork 12 has fork adjustments 16 that increase or decrease the spring constant, damping force, and other parameters of the front suspension. A Tracer™ (Trademark Serial No. 87,556,462 owned by Motion Instruments Inc.) or sensor 18 measures the deflection of the fork 12 through time. A front shock sensor or fork sensor 18 can couple to a fork 12 of a bicycle suspension system 11 to generate a vertical fork 12 deflection signal. The deflection signal represents the vertical deflection or displacement of the front shock or fork 12.

Similarly, shock 14 has shock adjustments 20 that increase or decrease the spring constant, damping force, or other parameters of the rear suspension. A tracer or sensor 22 measures the deflection of the shock 14 through time. The rear shock sensor 22 couples to a rear shock 14 of the bicycle suspension system 11 in conjunction with a leverage curve to calculate rear axle position derived from shock position to generate a vertical rear deflection signal representative of the vertical deflection of the rear shock 14.

The balance of the suspension system 11 includes the combined effects of the fork 12 and shock 14. Sensors 18 and 22 measure the magnitude of the deflections of the fork 12 and shock 16 as an operator rides the bicycle. When the ride is completed, a processor 24 (e.g., a desktop computer, a laptop, a tablet such as an iPad or Android device, a smart-phone such as an iPhone or Android, or another electronic device) connects to the front and rear sensors 18 and 22 to measure the deflection of the suspension system 11. The processor 24 connection may use wires, as shown in FIG. 1, or may connect wirelessly via Bluetooth, Wi-Fi, or other wireless connections.

When the tablet or processor 24 connects to sensors 18 and 22 it processes (e.g., downloads, stores, and analyzes) the deflection data measured over the course of the ride. The processor 24 can process the data and calculate a velocity of the deflections based on the magnitudes in the time domain. The system 10 also computes an acceleration of the deflections per unit time (e.g., by taking the anti-derivatives of the measured deflections in the time domain). System 10 is calibrated with the mass of the rider to determine the sag. System 10 can obtain or compute the acceleration. Thus, the processor can also determine the force generated by each event. Using the processes described below, processor 24 can assemble the data into a visual display of suspension system 11. This visualized data can help calibration and tuning of the fork 12 and shock 14 of the suspension system 11.

Processor 24 may couple to the sensors 18 and 22. Processor 24 may obtain raw deflection displacement and/or acceleration data from the sensors 18 and 22 connected to the fork 12 or shock 14 during an event. An event may include a right or left-hand turn, a jump, a climb, a bump, a drop, or another event that utilizes the damping force of the suspension system 11. For example, sensors 18 and 22 are position sensors that can capture raw deflection displacement data for an event. Processor 24 may obtain raw acceleration data from sensors 18 and 22 connected to the fork 12 or shock 14. For example, the acceleration sensors 18 and 22 are accelerometers that capture raw acceleration data for an event. Processor 24 may use the obtained raw deflection (displacement or acceleration) data to compute vertical components of the deflection in the vertical direction. For example, the processor may use a head fork angle and rear shock geometry to convert the raw data into vertical components of deflection.

Based on the vertical components of the displacement or acceleration, processor 24 can generate fork 12 or shock 14 velocity data. The velocity data is representative of a vertical component of the velocity of the front shock or fork 12 and rear shock 14 based upon the raw displacement or acceleration signals received by sensors 18 and 22. For example, the rear axle deflection is derived from the shock data using the leverage ratio of the bike. System 10 compares the axle deflections of the front wheel and rear wheel in the vertical direction. A system 10 that obtains raw displacement data can generate fork 12 and rear shock 14 acceleration data by deriving the vertical component of velocity. The processor 24 can anti-derive the vertical component of raw acceleration data at the fork 12 or rear shock 14 based upon the vertical component of the acceleration signals to generate a vertical velocity. Thus, processor 24 may obtain raw displacement data or raw acceleration data and generate vertical components of displacement, velocity, and acceleration in the fork 12 and rear shock 14.

Processor 24 may use a similar process to generate force data in the vertical direction for the fork 12 and rear shock 14. For example, the force is equal to the mass times the acceleration. Control system 10 is calibrated with a mass (e.g., sag) and processor 24 may obtain or generate a vertical acceleration to compute a force for each event. In this way, the raw displacement data and/or raw acceleration data can generate a vertical force based on the fork 12 or rear shock 14 vertical acceleration data for each event.

Similarly, processor 24 can generate total work for each event. Work is a function of force and displacement and processor can generate a vertical component of force and displacement in the fork 12 and rear shock 14. Thus, vertical components of displacement, zenith position data, velocity, acceleration, force, and work are obtained from a single displacement or acceleration obtained by sensors 18 and/or 22. Moreover, the obtained components for the fork 12 and shock 14 are independent for each event, such that the fork 12 and shock 14 may have different components of displacement, zenith position data, velocity, acceleration, force, or work for the same event.

Processor 24 can generate approximation curves, such as regression lines, curves, exponential curve fits, or other best-fit continuous functions, from the obtained components at the fork 12 and shock 14. Based on the approximation curves, processor 24 generates a video signal based upon the velocity data and zenith position data for the fork 12 and rear shock 14. In some embodiments, the approximation curve is based on the zenith position data of the front axle at the fork 12 and the rear axle derived by the deflection rear shock 14 data. For example, processor 24 may compare the zenith position and velocity data for the fork 12 to the shock 14 and make recommendations to damper force adjustments based on the approximation curves. For example, system 10 may make recommendations based on the slopes of the regression lines for the fork 12 and shock 14.

The fork 12 and shock 14 are calibrated with a sag displacement based on the rider's weight on a stationary bicycle. An event occurs when the displacement on the fork 12 and/or shock 14 are compressed or rebounding above a threshold value from the calibrated sag displacement. In other words, an event includes all displacements beyond a threshold value of the sag. Zenith position data filters the event data to obtain a maximum displacement in the vertical direction for the wheel axle at the fork 12 or shock 14 during an event. The zenith position represents the maximum displacement of the fork 12 or shock 14 in the vertical direction and is compared to the maximum velocity in the vertical direction to create a zenith position versus velocity approximation curve.

Processor 24 can compute the velocity versus zenith position data for recorded events and generate a fork 12 and a shock 14 regression line for the front axle and rear axle (e.g., derived from the signals at the fork sensor 18 and rear shock sensor 22). The regression line may be the zenith position versus velocity and/or the work for the deflection and rebound data versus velocity. The slope of the fork 12 regression line is compared to the slope of the rear shock 14 regression line to establish the recommended adjustments of the front shock and the rear shock. The recommendations may make the slopes of the regression lines parallel or nearly parallel (e.g., within 15 degrees of parallel). In some embodiments, the slope of the regression lines are adjusted to within 5°, 10°, 15°, 20°, 25°, or 30° of parallel. In some embodiments, the curve fit of an approximation curve for the fork 12 is compared to an approximation curve for the shock 14 and adjusted to generate the same curved shape and/or minimize the distance between the curves.

A display can couple to the processor to generate a visual representation of the velocity to zenith position approximation curve video signal. The processor 24 computes the signal for the fork 12 and rear shock 14. The visual representation can include curve fit analysis of the velocity data versus zenith position data for the fork 12 and rear shock 14, in a variety of formats. For example, the visual representation may include a scatter point plot with the raw data illustrated or may include only a curve fit of the raw data. The curve fit may include any continuous function that represents a continuous approximation of the zenith position data, velocity data, and/or work data. The display can further recommend adjustments to the damping force at the fork 12 and/or rear shock 14 based upon analysis of the curve fit.

Display 26 may be an application on a smartphone or tablet. Display 26 may be a computer or printer. Display 26 may illustrate recorded waveforms of the vertical displacement or acceleration signals that generate the zenith position, velocity, force, and work data for the fork 12 and rear shock 14 in the time domain.

Figure 2:
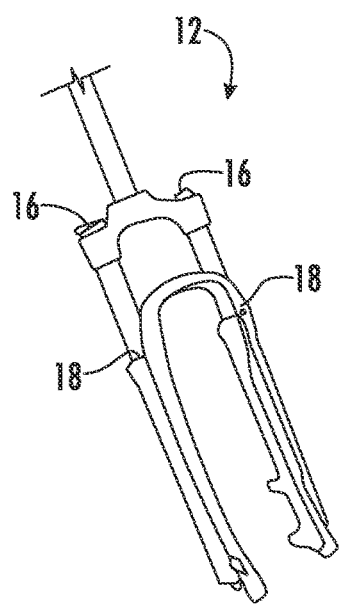
FIG. 2 is a detailed view of the front shock or fork on the suspension system illustrated in FIG. 1, according to an exemplary embodiment.
Figure 3:
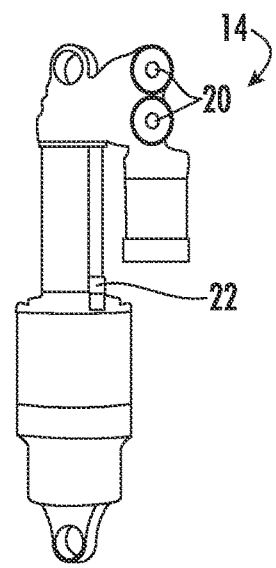
FIG. 3 is a detailed view of a rear shock or shock on a suspension system illustrated in FIG. 1, according to an exemplary embodiment.

FIG. 2 illustrates a detailed view of a fork 12 showing the location of the fork adjustments 16 and fork sensors 18. Similarly, FIG. 3 illustrates a detailed view of a shock 14 illustrated the placement of shock adjustments 20 and shock sensors 22. The component hardware illustrated in FIGS. 1-3 will be referred to throughout the application with the assigned reference numbers previously described. A complex suspension system 11 (e.g., with 200,000 settings for each shock absorber) can have billions of adjustable combinations. Control system 10 enhances suspension system 11 performance through an adjustment process.

Figure 4:
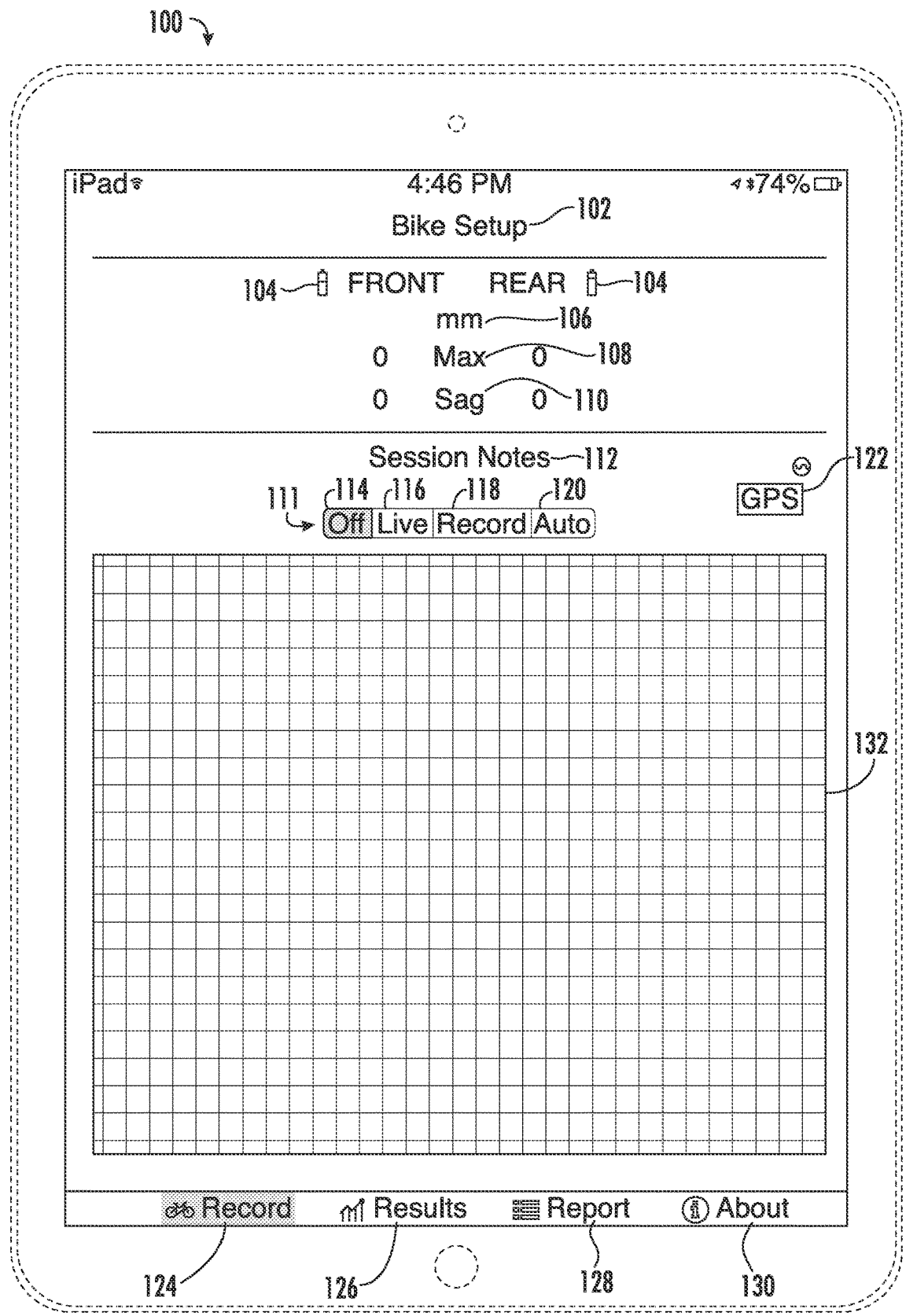
FIG. 4 is an image of a record module to record the events with calibrated and installed sensors, according to an exemplary embodiment.

FIG. 4 illustrates a home-screen 100 of control system 10. At startup, the home-screen 100 is displayed. From the home-screen 100, the operator can access most of the features of the system 10 and can see a summary of pertinent results. The home-screen 100 allows the operator to interact with the system 10 and record riding events and data. The home-screen 100 includes hyperlinks and/or displays for a bike setup module 102, a battery indicator 104, a relative/absolute measurement toggle 106, a maximum display 108, a sag indicator 110, and a note module 112. Home-screen 100 further includes a toggle bar 111 that includes an off toggle 114, a live toggle 116, a record toggle 118, and an auto toggle 120. Home-screen 100 can also hyperlink to a GPS module 122. Four components of control system 10 include a record module 124, results module 126, report module 128, and an about/help module 130.

Figure 5:
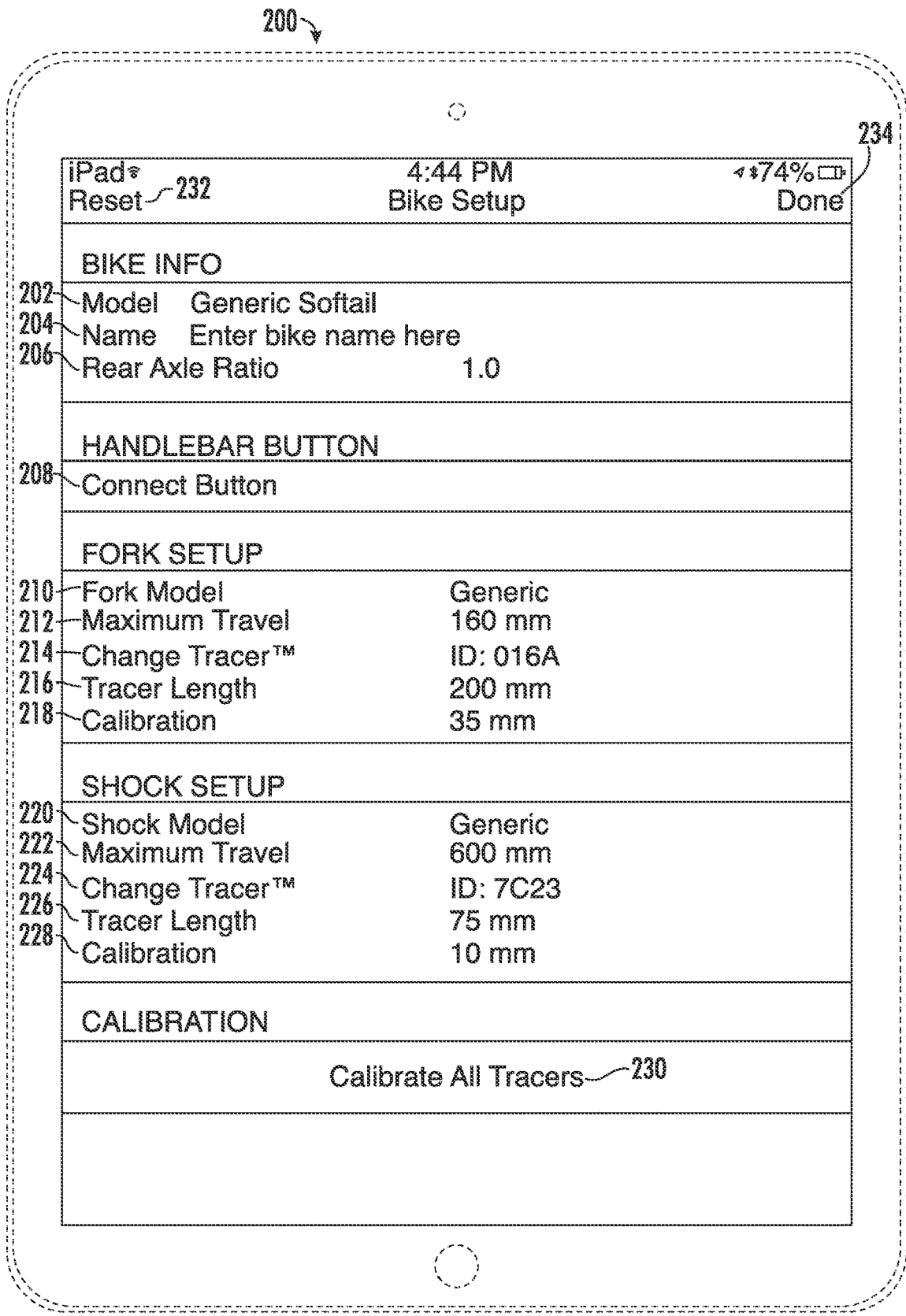
FIG. 5 is a bike setup module, where the model and geometry of the front shock and rear shock are identified, the leverage ratio is identified to calculate the rear axle vertical position relative to the instantaneous shock position, according to an exemplary embodiment.

When the operator first loads the home-screen 100 and presses the bike setup hyperlink 102 on the home-screen 100, system 10 loads the bike setup module 200 illustrated in FIG. 5. Bike setup module 200 enables the operator to input information to record data from one or more sensors on the suspension system. Bike setup module 200 enables the operator to input information about the bike, the suspension system, the sensors, and other pertinent parameters to begin recording a ride. A model input 202 allows the operator to input a standard bike model into the system 10. In some embodiments, model input 202 displays a list of available models. In some embodiments, model input 202 searches an input model name or number to determine the correct bike model. Model input 202 may ask the user to confirm the selected or identified bike model.

Name 204 enables a user to name the bike and/or give a customized name to the results obtained on a bike. The name 204 may allow one bike to be stored at a time or several bikes can be stored in the system with different customized names 204.

The rear axle ratio is a measurement of the amount of travel at the rear wheel relative to the displacement at the shock 14. It is a ratio, so a rear axle ratio of one means that the distance the shock 14 travels is equal to the distance the rear wheel travels. The rear axle ratio is determined by the system 10 based on the model input 202 of the bike. In some embodiments, the rear axle ratio is determined by system 10 based on the user input shock model 220. If system 10 does not support the bike model input 202, the user can customize the rear axle ratio (e.g., by inputting the shock model 220 number). The system 10 may prevent users from editing the rear axle ratio or may allow different versions of system 10 to access or adjust this ratio.

The connect button 208 pairs system 10 with the sensors 18 and 22. The system 10 can be paired through bluetooth, WiFi, a network connection, through electric cables or wires (as illustrated in FIG. 1), or by other electronic means. The connect button 208 can determine whether sensors 18 and 22 at the front fork 12 and rear shock 14 are actively outputting data and whether system 10 can record the data.

The fork model 210 and shock model 220 allow a user to input model numbers or otherwise identify the shocks on the bike. For example, a customized bike may have different fork 12 and shock 14 models 210 and 220 than indicated based on the model input 202 number. Identifying the fork model 210 and shock model 220 defines the maximum fork travel 212 and maximum shock travel 222 respectively. In some embodiments, the operator cannot edit the maximum fork travel 212 or maximum shock travel 222 data. System 10 may select the data based on the input fork/shock model numbers 210 and 220. In other embodiments, the application allows the user to input the maximum fork travel 212 and maximum shock travel 222 without defining the fork model 210 or shock model 220.

The fork tracer ID 214 and shock tracer ID 224 identify the sensors 18 and 22 at the fork 12 and shock 14, respectively. The fork tracer length 216 and shock tracer length 226 are selected so that the sensors can detect a distance greater than or equal to the maximum fork travel 212 or maximum shock travel 222.

The fork tracer calibration 218 and shock tracer calibration 228 output the results obtained from calibration module 230. Calibration module 230 and fork/shock tracer calibration numbers are not user programmable. To calibrate the sensors, the operator lifts the bike off the ground to completely unload the suspension system 11. When the calibration module 230 is activated (e.g., the "Calibrate All Tracers" hyperlink is selected), the bottom of the shock absorber (e.g., the fork 12 and rear shock 14) is defined. This process sets the "zero" value of the sensor 18 and 22 on the suspension system (e.g., the minimum deflection). Because the sensor 18 and 22 length is longer than the maximum travel (e.g., stroke length) of the suspension, the system 10 must calibrate the minimum deflection, or bottom, of the suspension system 11. Once calibrated, all displacements are determined relative to the set zero value. Once the user enters the calibration module 230, the user cannot exit the module 230 without tapping the "Calibrate All Tracers" hyperlink. If the user tries to exit, system 10 generates a warning and the data obtained may not provide accurate results.

Once the bike is set-up, the user can either select reset 232 to remove all values and start over or press done 234 to save the data and return to the home-screen 100. The reset 232 button may enable the correction of mistakes or to adjust system 10 for use with another bike. When done 234 is selected the data in the bike setup module 200 is stored for the suspension system 11 and the user returns to the home-screen 100.

Returning to FIG. 4, the home-screen 100 includes a battery indicator 104. Battery indicator 104 appears when the tracers or sensors 18 and 22 connect to system 10. System 10 reads the battery strength of the sensors 18 and 22 and adjusts the displayed battery levels according to the reading. When the battery level appears, it means the system 10 is connected to the sensor and ready to record. If the system 10 cannot connect to the battery, a spinning wheel in the same place the battery would appear indicates the system 10 cannot connect to the sensors 18 and 22. The sensor 18 or 22 may include an accelerometer that requires an adequate power supply to operate. Thus, battery indicator 104 may indicate when batteries should be replaced for a long ride or when power to an accelerometer is absent or generates inaccurate results. System 10 may implement a power saving measure on the sensor to put the unit to sleep when sensor 18 or 22 is not connected or after a period of non-use (e.g., after 5 minutes). The battery indicator 104 visually indicates whether the sensors are transmitting data or connecting to the system 10. In the event the sensor 18 and 22 has adequate power but is in sleep mode, the operator can shake the bike and activate sensors 18 and 22. Once sensors 18 and 22 are advertising to system 10, battery indicator 104 shows the power supply available.

Figure 6:
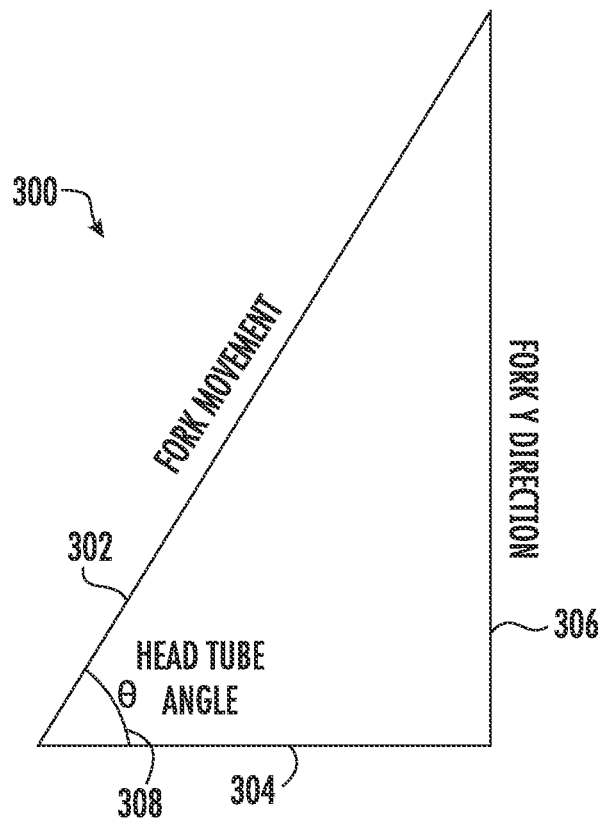
FIG. 6 illustrates a vector normalization of the obtained displacements to measure the vertical component of the fork, according to an exemplary embodiment.

System 10 uses sensors to detect deflections in the vertical directions. The distances of these deflections are used to determine the velocity and acceleration as anti-derivatives of the position. The measured deflections are not generally in the vertical direction. For example, with reference to FIG. 6 illustrating a vertical speed normalization, the forks movement 302 (and velocity) is the sum of two component vectors (e.g., a horizontal component 304 and a vertical component 306). The component vectors can be obtained based on the head tube angle 308 of the fork 12. In this way, processor 24 can obtain a horizontal component 304 and a vertical component of the fork position, speed, and acceleration. Since the objective of the suspension system is to match the vertical displacement at the fork 12 to the vertical displacement of the shock 14 for the suspension system 11, the horizontal component 304 may be removed and the vertical component 306 of fork 12 compared to the vertical component of shock 14. The geometry of the shock 14 is similarly used to determine vertical components of the position, speed, and acceleration that can be matched or compared to the vertical components 306 of the fork 12.

Similarly, the deflection of the rear shock 14 is determined in the vertical direction. The shock position is measured and the rear axle vertical displacement is calculated using the leverage curve of the bicycle. The leverage curve is a value on a table based on the model of the shock 14. The displacement in the shock 14 is related to a displacement of the axle of the rear wheel. For example, a position of 100 mm on shock 14 corresponds to vertical position 86 mm on the rear axle. In some embodiments, the rear axle vertical displacement is calculated using the leverage curve of the bicycle. In other embodiments, the manufacturer provides a rear axle position. A pivot sensor can measure the angle of the pivot. The pivot sensor can measure the relative angle between two pivot points with an angle sensor. The pivot sensor measures the deflection based on measured deflections of two angles on a pivot.

FIG. 4 illustrates a relative/absolute measurement toggle 106 that allows a user to determine whether these vertical components 306 are conveyed to the user in absolute or relative terms. For example, system 10 may display an absolute deflection of 35 mm to indicate an event. Similarly, system 10 may display a 17.5% deflection to indicate the same event (e.g., a 35 mm deflection divided by a 200 mm max deflection). Depending on the desired result, a relative or absolute measurement may be preferred, and toggle 106 enables user selection of the displayed result.

Home-screen 100 may include a maximum displacement display 108, indicating the furthest sensor displacement (e.g., from calibrated "zero") obtained since the system 10 was turned on or for a downloaded set of data points. This number can be displayed as an absolute value (e.g., mm) or as a relative value (percent of total displacement).

Similarly, home-screen 100 can display the amount of sag 110 in absolute or relative terms. Static sag 110 measures the deflection caused by a stationary rider sitting on the bike. Sag 110 defines the preload in the damper caused by the rider's weight. Suspension manufacturers provide recommendations for the preload on the fork 12 and shock 14 absorbers based on the damper spring rate. In some embodiments, the spring rate can be adjusted by adding or removing air pressure from the damper, allowing for more or less preload and/or rider weight.

Figure 7:
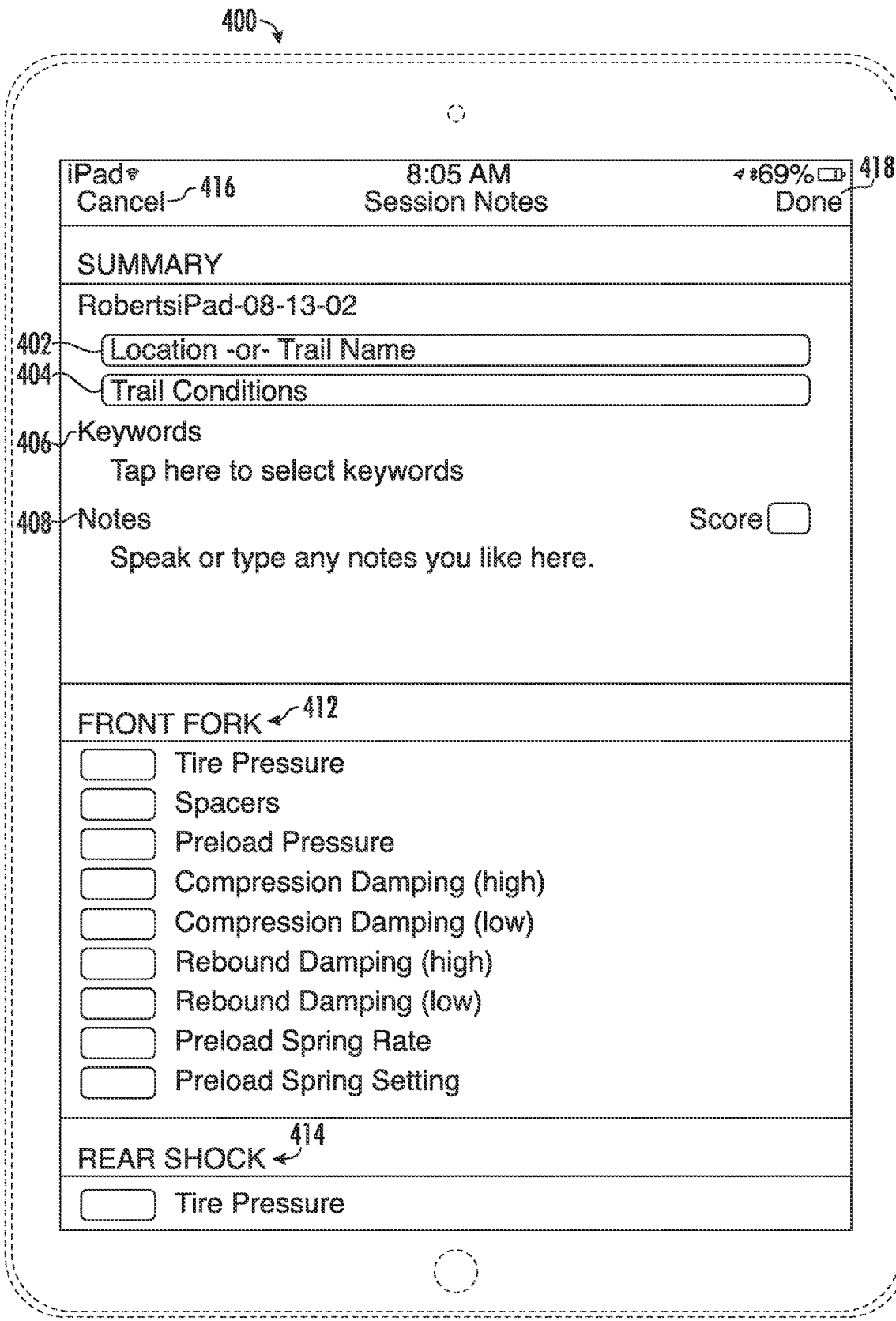
FIG. 7 is a user interface where user notes are input into the system, and details about the performance are annotated, according to an exemplary embodiment.

Selecting the note module 112 hyperlink on home-screen 100 loads a note module 400, illustrated in FIG. 7 that allows the user to capture the fork 12 settings and shock 14 settings on a particular ride. This may be useful if adjustments are made to the settings to be able to "revert back" or compare old and new results. Note module 400 may include a location or trail name 402 as well as a trail condition 404 input. The user may identify keywords 406 to identify a particular ride or event classification. The rider may input any general notes 408 using speech recognition and rate the ride results with a score 410. Fork parameters 412 may also be recorded for a particular ride. Fork parameters 412 may include the tire pressure, spacers, preload pressure, compression damping (high), compression damping (low), rebound damping (high), rebound damping (low), preload spring rate, preload spring setting, and other parameters. The same or similar shock parameters 414 can be annotated and recorded for the rear shock. The user can return to the home-screen 100 by pressing the cancel button 416 or the done button 418. The cancel button 416 returns to the home-screen 100 without saving the changes, whereas the done button 418 returns to the home-screen 100 after saving the annotations.

Returning to FIG. 4, a toggle bar 111 may allow selection of four different recording modes. Off toggle 114 means that the sensors are powered off, and system 10 is not recording any displacement data. The live toggle 116 displays displacements of the sensors in real-time on the real-time display 132, but may not record the results in long-term memory. The user may view the instantaneous displacements, but system 10 won't save the results for future analysis. The record toggle 118 records all displacements upon pressing the button. The real-time results are displayed on the real-time display 132 and stored for future retrieval and/or analysis. System 10 records every displacement or absence of displacement at a fixed frequency (e.g., 200 Hz) in record mode 118. Different sample frequencies may be used and can depend upon the bandwidth of system 10 to the connection of sensors 18 and 22. For example, the frequency can be 100, 120, 140, 160, 180, 200, 220, 240, 260, 280, 300, 320, 340, 360, 380, or 400 Hz, based upon the bandwidth of the connection to sensors 18 and 22. The auto toggle button 120 is similar to the record toggle 118 except that system 10 automatically discards "junk data" (e.g., data obtained in the absence of a displacement or when a sensor is not operating correctly). Auto toggle 120 only records data when the bike is moving (e.g., it stops recording when the rider stops to take a break) and trims the file size of the results by removing stationary data. When the operator is done recording in either record mode 118 or auto mode 120 system 10 presents the user with an option to store or discard the data.

As described in further detail below, the home-screen 100 may include a GPS module 122 hyperlink to record the GPS coordinates of a ride. The home-screen 100 also includes selection buttons for four primary sections of control system 10. The record module 124 receives input data for recording a ride and is accessed through the default home-screen 100, as described above. The record module 124 allows the user to define the bike, connect the sensors, and record data. For example, record module 124 records data at a fixed frequency. Record module 124 couples to display 26 to generate waveforms of the vertical component of the displacement, velocity, and acceleration in a time domain. The results module 126 lets the user navigate to different graphics and tables to visualize the data. The report module 128 generates a standardized report that compares several previously recorded rides. This page allows the user to compare bike settings and recorded metrics side-by-side and allows comparison testing between alternative fork 12 and shock 14 settings. The about/help module 130 provides system 10 firmware and firmware versions of sensors 18 and 22. The module may contain marketing information, search functionality, help pages, and/or instructions for connecting sensors 18 and 22 to a bicycle.

FIGS. 8-13 illustrate the results module 126 in further detail. Once data is acquired, the user can press the results module 126 on home-screen 100 to open the summary results module 500 illustrated in FIG. 8. The results module 500 has three main components: the front suspension component 502, the rear suspension component 504, and the balance component 506. The front suspension component 502 isolates the summarized results to the front suspension or fork 12. Similarly, the rear suspension component 504 displays summarized results for the rear suspension or shock 14. Front suspension component 502 data is displayed in FIG. 8 for fork 12. The same or similar data is available for the rear shock 14 in rear suspension component 504. The balance component 506 analyzes the suspension system 11 as a whole and includes data from the front fork 12 and the rear shock 14.

Figure 8:
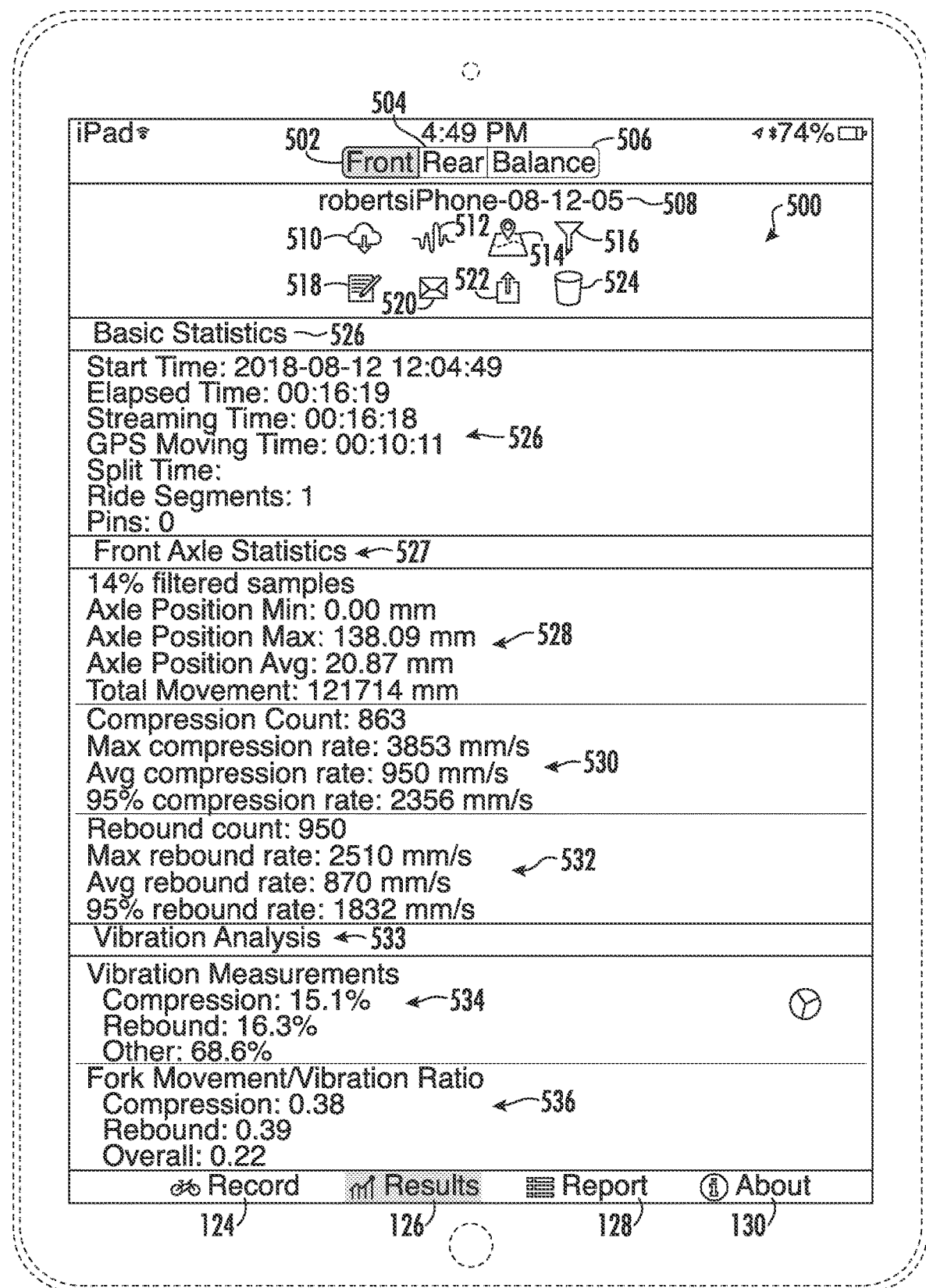
FIG. 8 is a summary page of the results module providing summary data of the ride and events, according to an exemplary embodiment.

The current file 508 displays the loaded file for analysis (e.g., FIG. 8 displays the file "robertsiPhone-08-12-05"). Current file 508 is a hyperlink and can be altered or replaced by tapping on the hyperlink. When activated the hyperlink provides a list of previously recorded files displaying the files currently stored in system 10. Files can be stored locally or on a network. In some embodiments, the current files 508 include only files saved on a local drive. In other embodiments, the current files 508 include files on a local drive and/or a network (e.g., cloud drive). A download file button 510 allows the user to download a file stored on a network to a local drive.

The recorded waveform module 512 allows for visual inspection of raw data. The waveform (e.g., illustrated in FIGS. 11 and 12) shows the raw sensor data displayed in the time domain. The recorded waveform module 512 allows users to drill into specific events of a ride and to see the actual waveform generated by the sensors. In some embodiments, different filters 516 display or remove specific data. For example, a user can remove a checkbox from system 10 to remove the data for a particular filter from the screen. The recorded waveforms 512 are described in greater detail below with reference to FIGS. 11 and 12.

Figure 14:
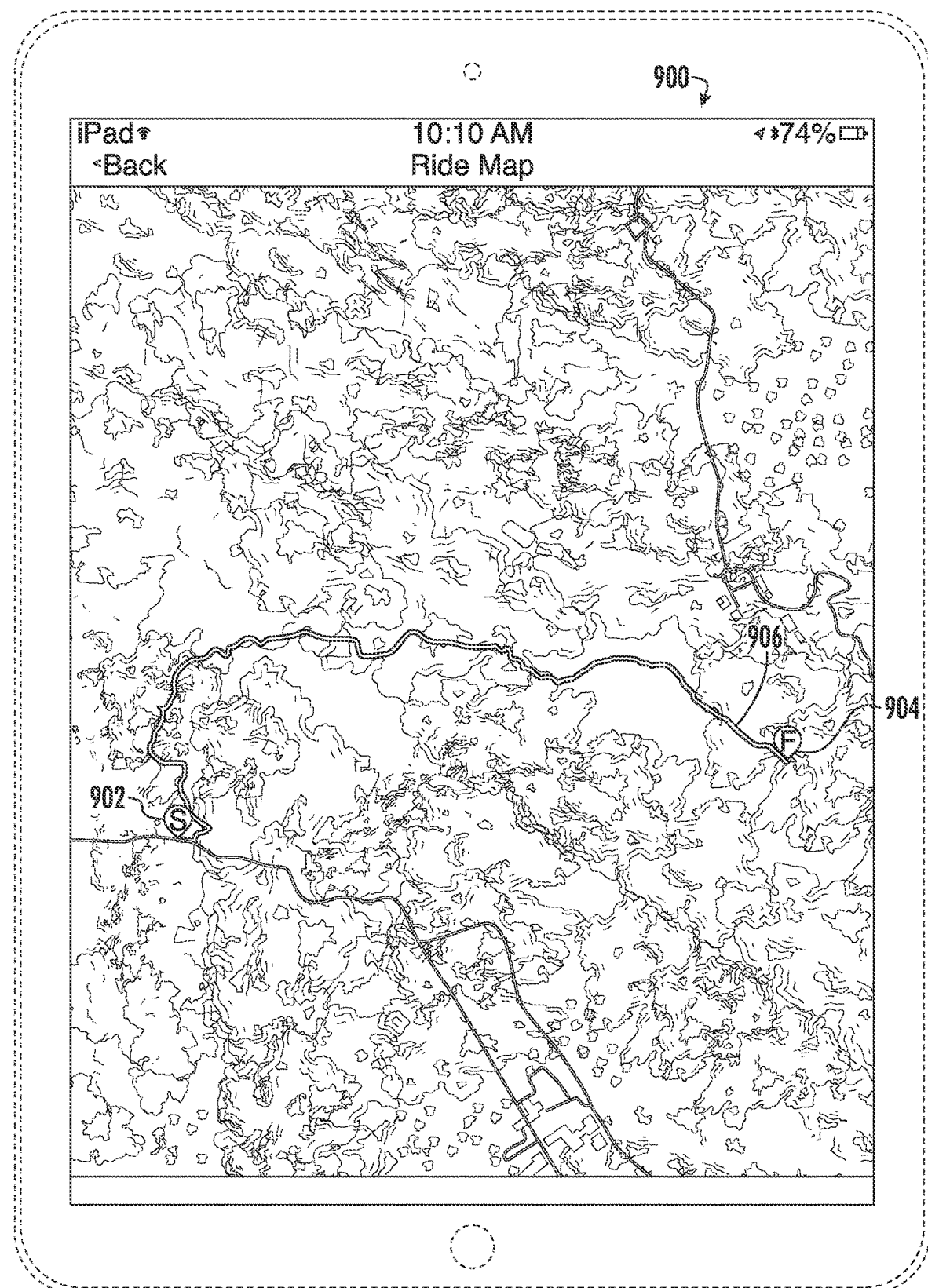
FIG. 14 is a GPS tracker for a ride, illustrating the locations of events and where the ride began and ended, according to an exemplary embodiment.

The results screen may have a similar GPS hyperlink 514 as hyperlink 122 displayed on the home-screen 100 of record module 124. GPS hyperlinks 122 and 514 may display the GPS module 900 shown in FIG. 14 described in reference to that figure below.

A filter 516 may screen out data or events that the user doesn't want analyzed. For example, using filter 516, a user can analyze the fork 12 and shock 14 data for all right turn events during a ride recorded on a file 508. Filter 516 may also filter compression and rebound strokes that don't meet a minimum or maximum amplitude or time constraint. Notes hyperlink 518 may connect the user to the note module 400 described above. A mail icon 520 may allow the user to email the data to himself or customer support for help analyzing a file 508. An upload hyperlink 522 allows the user to zip the recorded file 508 and transfer the file 508 via text messaging, AirDrop, to a network through WiFi or cell coverage, using an application such as MotionIQ™ (Trademark Serial No. 87,556,457 owned by Motion Instruments Inc.), or other software with the ability to receive and unpack zip files. A discard icon 524 allows the user to delete the current file 508 and any accompanying data.

Filter 516 can be used to identify the beginning and end times of a series of deflection signals along a ride. For example, processor 24 can selectively analyze filtered deflection signals for zenith position data, velocity data, acceleration data, force data, and work data analysis. Display 26 generates a visual representation of the filtered velocity data versus zenith position data and/or velocity data versus work data for those events selected in the time domain. Filter 516 can identify specific event types (e.g., right-hand turns or jumps) to select specific displacement data or acceleration data corresponding to that event type. Using the filter 516 in this way generates a velocity versus force/work visual representation for the identified event types based on the filtered data.

Filter 516 may be used between any two pins. Pins can be dropped throughout a ride. A pin is simply a GPS location at a particular time. If GPS is not present, the pin is a marker at a particular point of the recording. To filter, tap the filter 516 icon, select start and end pin. The analysis excludes unfiltered events and analyzes the filtered events that were recorded between the start pin and the end pin.

The basic statistics 526 of a ride can be recorded on the summary results page 500. The basic statistics 526 may include the start time and date of a ride, the elapsed time of the ride and the time the sensors were streaming. The GPS moving time may measure the time that the bike was moving and the ride segments may show any breaks in the data stream (e.g., for breaks where the bike is not moving). System 10 displays similar basic statistics 526 for the shock 14 in the rear shock component 504.

The front axle statistical results are unique to the front axle, but the rear axle also has similar rear axle statistical metrics. The statistics can be divided into displacement statistics 528, compression statistics 530, and rebound statistics 532. For example, the percentage of filtered sampled and analyzed, the minimum, maximum, and average axle positions, and the total axle movement may be recorded as the displacement statistics 528. The compression count, maximum and average compression rate, and statistical two sigma compression rate may be included as the compression statistics 530. Similar measurements for the rebound count, max and average rebound rate, and two sigma rebound rate may be included in the rebound rate 532.

Based on the displacement and front axle statistics, dynamic forces such as vibration statistics can be determined. Vibration measurements 534 may include relative compression, rebound, and/or other statistics. The fork movement/or vibration ratios 536 may have absolute compression, rebound, and/or other statistics. The summary results page 500 for the rear suspension component 504 may include similar statistics.

Figure 9:
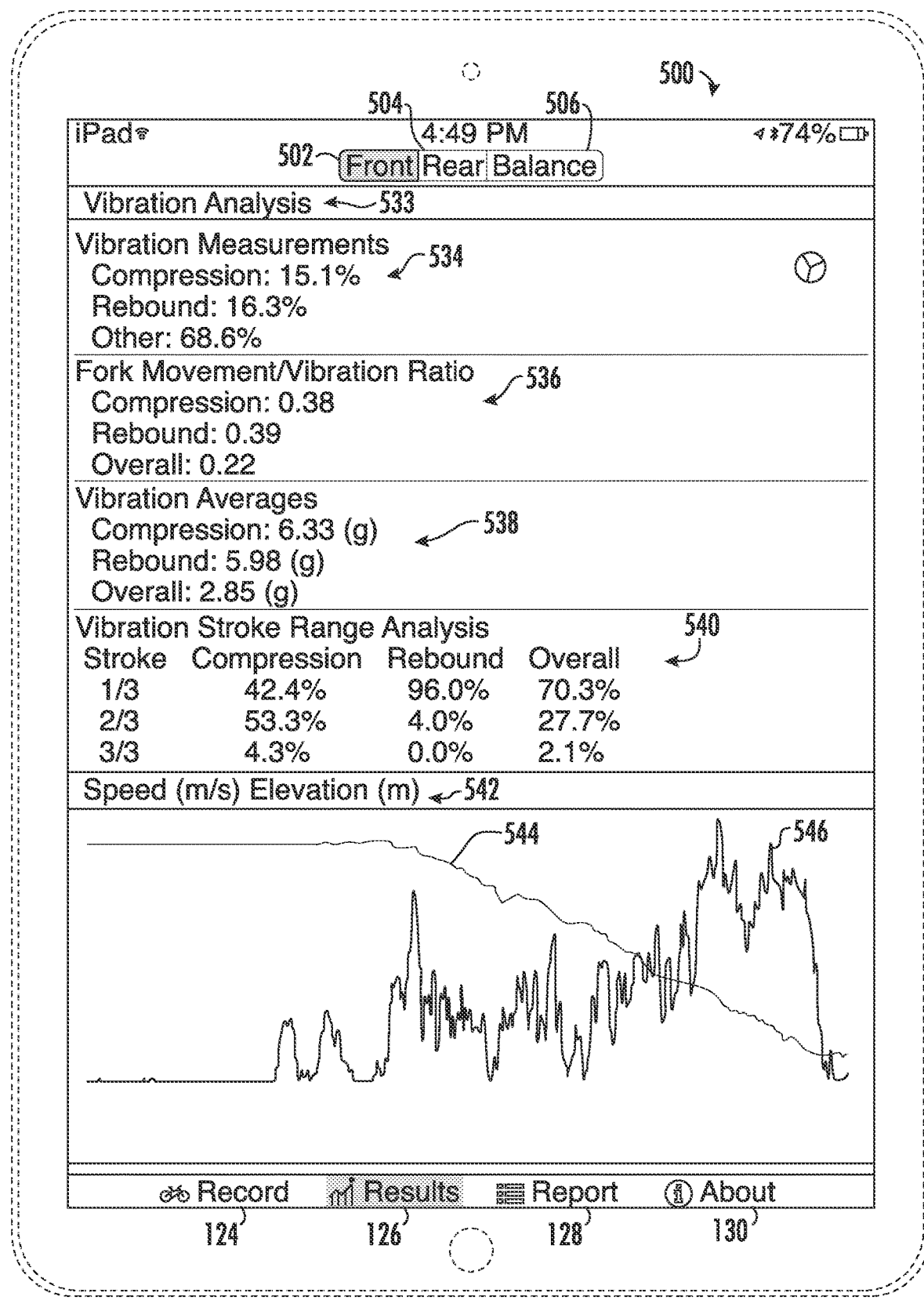
FIG. 9 is a continuation of the summary page of the results module illustrated in FIG. 8, according to an exemplary embodiment.

FIG. 9 is a continuation of FIG. 8 (e.g., when a user scrolls down on the basic statistics 526 module of the results module 126). For example, vibration measurements 534 and vibration ratios 536 are displayed. The vibration analysis 533 includes vibration averages showing the values in multiples of gravity (e.g., a 6.33 g compression average) and a stroke analysis 540 of the compression and rebound events. System 10 visualizes the data as a speed (m/s) versus elevation (m) plot 542. The elevation 544 (measured in meters) decreases as the rider comes down a mountain and the speed 546 gradually increases.

Figure 10:
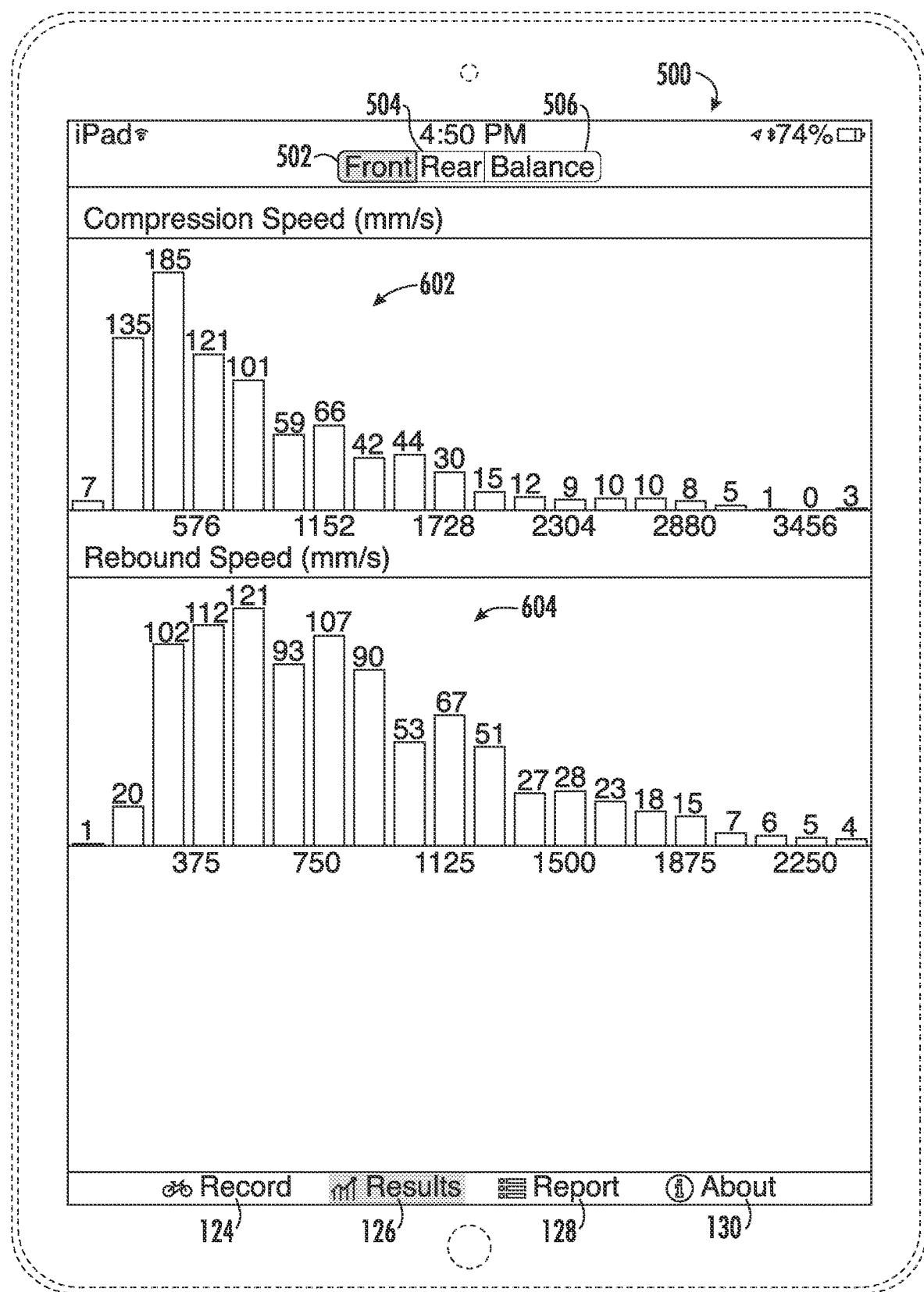
FIG. 10 illustrates a histogram of the derived compression speeds and rebound speeds for a ride, according to an exemplary embodiment.

FIG. 10 displays the cumulative number of compressions and rebound speeds for a given ride as a histogram. For example, the histogram indicates a compression speed 602 at approximately 576 mm/s resulted in 185 compressions for this ride. Similarly, only 3 compressions exceeded a 3,456 mm/s compression speed. System 10 generates a similar histogram for the rebound speed 604 indicating the rebound speeds in mm/s for all the rebound events. For example, FIG. 10 illustrates 93 rebounds with an approximate speed of 750 mm/s.

Figure 11:
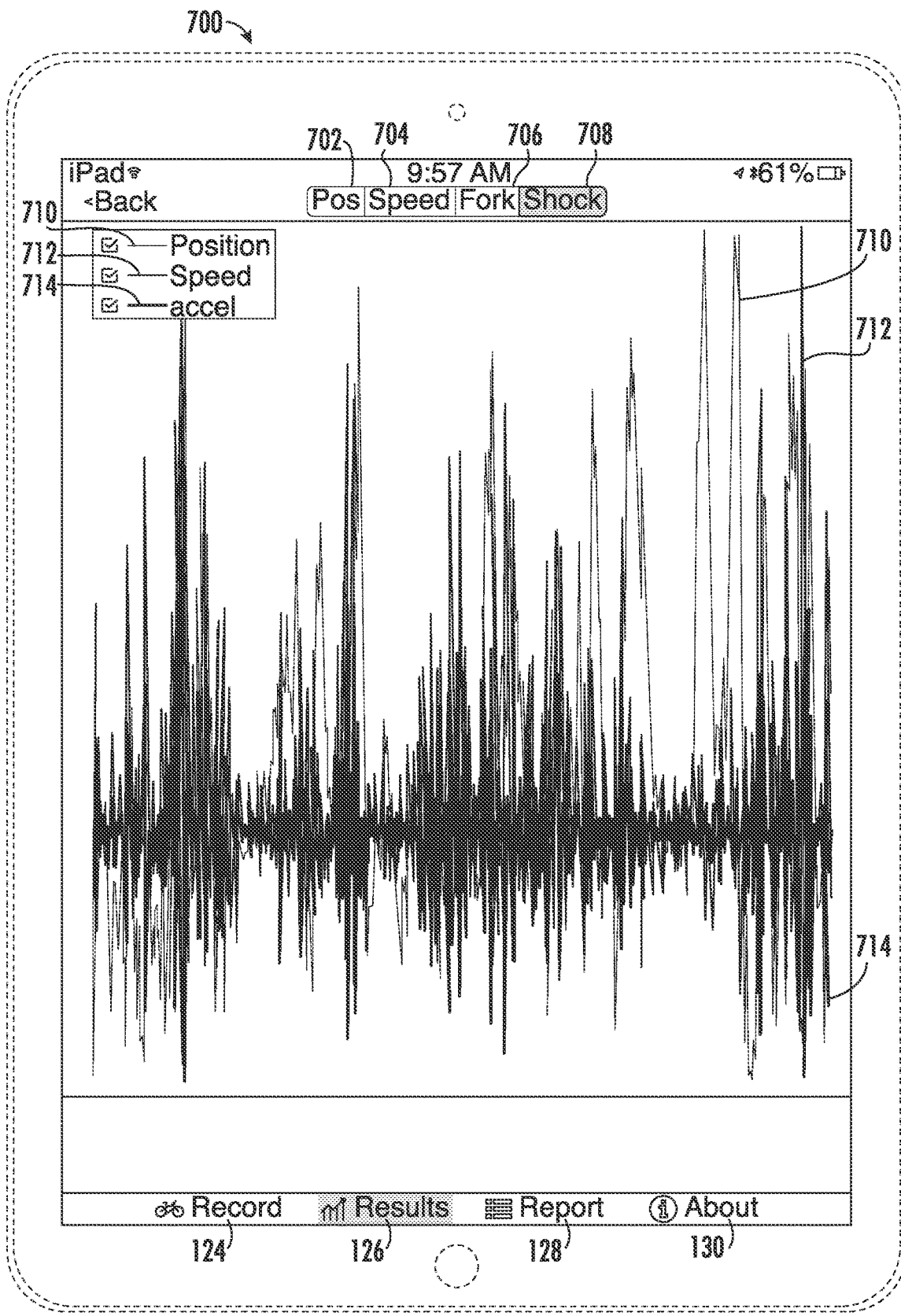
FIG. 11 is a waveform of a ride with multiple events.

FIG. 11 illustrates a recorded waveform 700 in the time domain. The recorded waveform 700 has several filters including the position/displacement filter 702, the speed filter, 704, the fork filter 706, and the shock filter 708. Several filters may be selected simultaneously for different visualizations of the raw data. For example, FIG. 9 illustrates a displacement plot 710, a speed plot 712 and an acceleration plot of the shock filter 708. Similar data can be obtained for the fork filter 706. In some embodiments, the fork filter 706 and the shock filter 708 may be plotted simultaneously.

Figure 12:
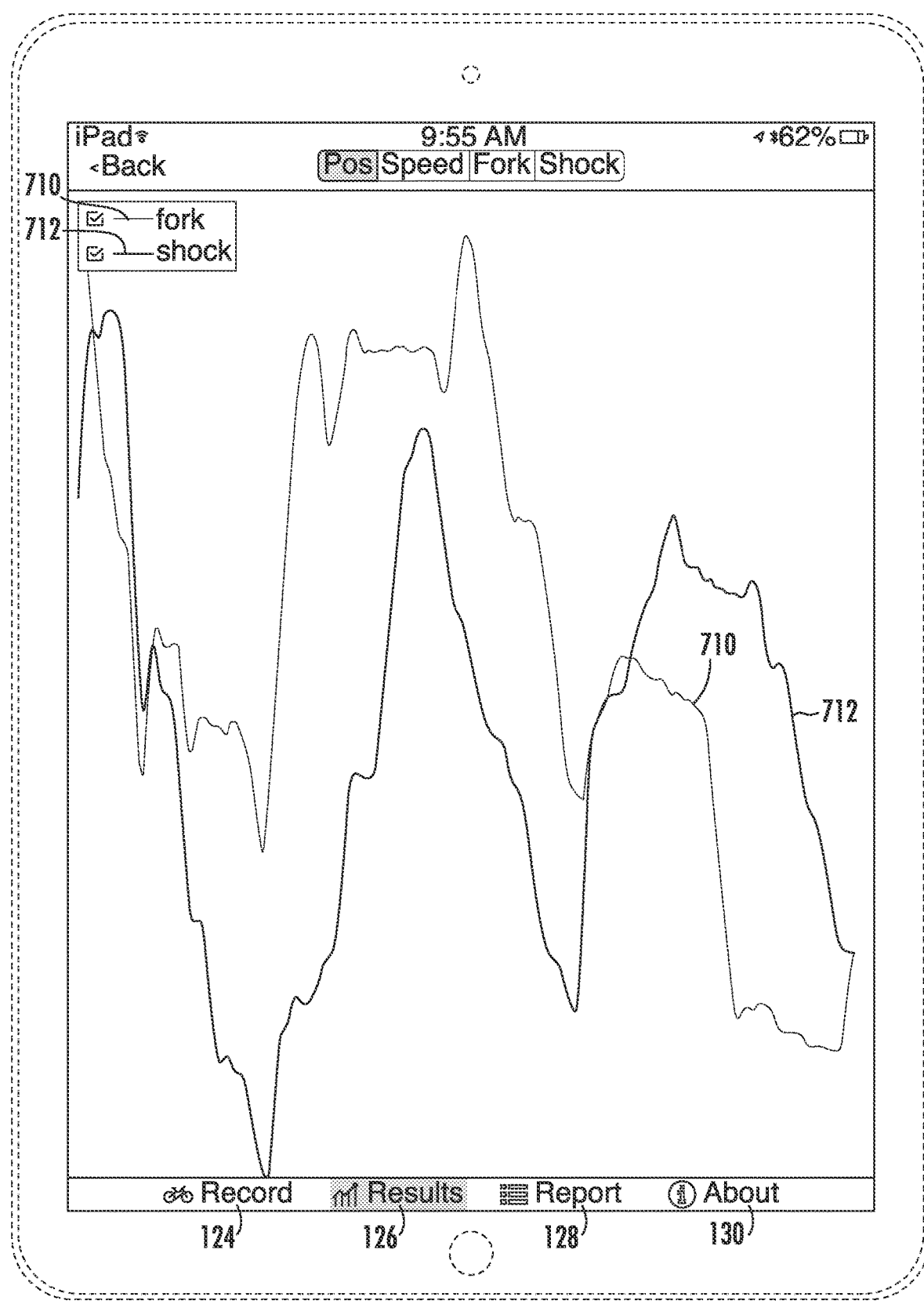
FIG. 12 is the waveform of FIG. 11 zoomed in to show the waveform of the events.

FIG. 12 illustrates a zoomed in (e.g., a 10 second framed view) perspective of the displacement plot 710 and the speed plot 712 illustrated in FIG. 11. The waveforms in FIG. 12 show the continuity of the displacement plot 710 and speed plot 712. Only when the time domain is large does the representation create the sharp vertical lines representing extreme events shown in FIG. 11.

The results module 500 of FIG. 8 includes a balance component 506 introduced above. The balance component 506 relates fork 12 data to shock 14 data to determine overall suspension system 11 performance. When the user touches the balance component 506 in FIG. 8, system 10 opens a balance results module 800 shown in FIG. 13.

Figure 13:
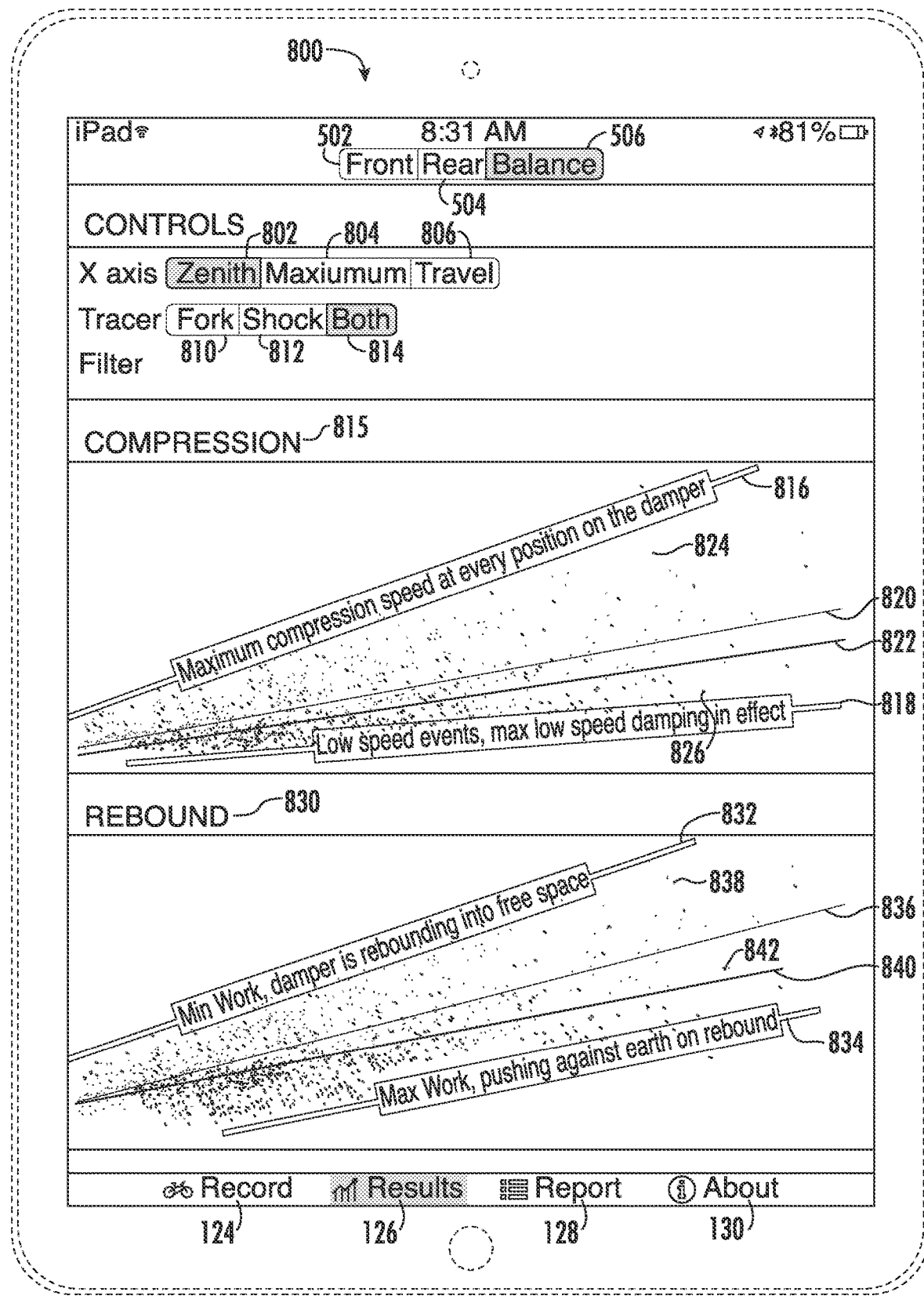
FIG. 13 is a regression analysis of a speed of compression and a damper rebound.

As illustrated in FIG. 13, the balance data includes a toggle filter to select zenith data 802 acquired at the reversal of a compression or rebound, maximum data 804 that includes only the maximum values for an event and excludes other data, and travel data 806. Travel data 806 includes all collected data. The user can filter data based on the fork filter 810, shock filter 812, or both (e.g., filter 814). As illustrated, the suspension system 11 balance 506 of zenith data 802 for both the fork 12 and shock 14 is selected. This creates scatter-plots of zenith data 802 for both the fork 12 (light dots and light line) and the shock 14 (dark dots/line). The compression scatter-plot 815 includes data points for the speed of compression versus the displacement caused in the damper. The maximum compression speed 816 is calculated as a sigma regression line (e.g., a 6 sigma extreme theoretical value indicating the maximum compression speed). Similarly, the minimum or low-speed events are calculated as a sigma regression line for the data (e.g., a 6 sigma extreme theoretical value indicating minimum compression speed). The light line or fork regression line 820 and the dark line or shock regression line 822 are created by the regression analysis of fork data 824 (indicated by a light dot) and shock data 826 (indicated by a dark dot).

The regression analysis of the fork regression line 820 and shock regression line 822 provides an way to determine the balance of suspension system 11. Applicant has found that when the fork regression line 820 and shock regression line 822 are parallel, or nearly parallel, the suspension system 11 is balanced. For example, the illustrated suspension system 11 is more balanced in the compression scatter-plot 815 than in the rebound scatter-plot 830. This gives the rider a quick way to visualize the data and adjust the settings on the suspension system 11.

The rebound scatter-plot 830 has similar features to the compression scatter-plot and is used to visualize the balance on the suspension system 11. For example, a minimum work 832 (or maximum rebound) and maximum work 834 (or minimum rebound) are determined based on the theoretical sigma values of statistical analysis. Similarly, the fork regression line 836 is based on the fork data 838. The shock regression line 840 is determined based on the shock data 842. Thus, the regression analysis shown in the compression scatter-plot 815 and rebound scatter-plot 830 provide a method of visualizing the suspension systems balance for the combined spring rates of the fork 12 and shock 14 working as a system.

As described above, the rider can select a GPS hyperlink 122, 514 on the home-screen 100 or results page 500. GPS hyperlinks 122 and 514 may display the GPS module 900 shown in FIG. 14. The GPS module 900 stores the beginning or start 902 and end or finish 904 of a ride. This enables the operator to compare the analytical results obtained from a ride with the difficulty and location of the ride. Competitors may tune a bike for a particular course, for example, by riding the course and visually comparing the data, as described. GPS module 900 may also remind the operator to note the difficulty or strenuousness of a ride and make adjustments accordingly. GPS module 900 can be linked to work with any of the modules described above and supports the data obtained from control system 10.

The processor 24 described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, a proprietary operating system may control the computing device. Conventional operating systems control and schedule computer processes for execution, perform memory management, provide file system, networking, I/O services, and provide a user interface functionality, such as a graphical user interface ("GUI"), among other things.

The processors 24 described herein may implement the techniques described herein using customized hard-wired logic, one or more Application Specific Integrated Circuits (ASIC) or Field Programmable Gate Arrays (FPGA), firmware and/or program logic which causes processors to be a special-purpose machine. According to one embodiment, parts of the techniques disclosed herein are performed by processor 24 of FIG. 1 in response to executing one or more sequences instructions contained in electronic memory. Such instructions may be read into or from memory from another storage medium, such as storage device. Execution of the sequences of instructions contained in memory causes the processor 24 to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine. Examples include a processor device, a Digital Signal Processor (DSP), an ASIC, an FPGA or another programmable logic device, discrete gate or transistor logic, discrete hardware components, or any combination thereof designed to perform the functions described herein. A processor device can be a processor 24, but in the alternative, the processor device can be a controller, microcontroller, or state machine, combinations of the same, or the like. A processor device can include electrical circuitry configured to process computer-executable instructions. In another embodiment, a processor device includes an FPGA or another programmable device that performs logic operations without processing computer-executable instructions. A processor device can also be implemented as a combination of computing devices, e.g., a combination of a DSP and a processor 24, a plurality of processors 24, one or more processors 24 in conjunction with a DSP core, or any other such configuration. Although described herein primarily concerning digital technology, a processor 24 device may also include primarily analog components. For example, some or all of the rendering techniques described herein may be implemented in analog circuitry or mixed analog and digital circuitry.

The processor 24 can store the processed images in memory and/or transmit the images to a display 26. The processor 24 can transmit the images to display 26 in real time. Display 26 includes any device configured to receive images and display or store the images. In some embodiments, display 26 is located at or near system 10. In some embodiments, display 26 is remote from system 10. In addition, display 26 can include a device (e.g., memory) that stores data and/or signals for future analysis and verification. Such a display 26 effectively documents and stores the data and/or signals.

Display 26 includes any device that receives a processed signal. For example, display 26 includes, but is not limited to, a mobile phone (e.g., a smartphone), monitoring devices, electronics systems, webcams, a television, a computer monitor, a computer, a hand-held computer, a tablet computer, a laptop computer, a personal digital assistant (PDA), a digital video recorder (DVR), a multi-functional peripheral device, etc. Display 26 apparatuses can include unfinished products, lenses, and/or memory.

In system 10, electronic memory includes any non-transitory computer-readable storage medium. Memory can be located anywhere within system 10. For example, system 10 can locate memory in display 26, a separate computing device, the cloud, and/or in other locations. Processor 24 may access memory to obtain measured displacement and/or acceleration data. For example, the raw data, as well as the calculated zenith position, velocity, force, work, and approximation curves (e.g., regression lines), can be stored in memory. These program instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques described herein. The special-purpose computing devices may include desktop computer systems, server computer systems, portable computer systems, handheld devices, networking devices or any other device or combination of devices that incorporate hard-wired and/or program logic to implement the techniques.

It should be understood that the figures illustrate the exemplary embodiments in detail, and it should be understood that the present system 10 is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A system for configuring a damping force on a suspension system of a bicycle, the system comprising:
a memory device configured to store front shock zenith position data, front shock velocity data, rear shock zenith position data, and rear shock velocity data for a bicycle, the bicycle comprising a front shock and a rear shock,
wherein the front shock zenith position data and the front shock velocity data are representative of movement of the front shock over time, and the rear shock zenith position data and the rear shock velocity data are representative of movement of the rear shock over time; and
a hardware processor in communication with the memory device, the hardware processor being programmed to:
generate a first approximation curve by curve fitting the front shock zenith position data and the front shock velocity data,
generate a second approximation curve by curve fitting the rear shock zenith position data and the rear shock velocity data,
generate an indicator that is responsive to a comparison of the first approximation curve and the second approximation curve, and
output the indicator for presentation to a user.

2. The system of claim 1, wherein the indicator comprises an indication of an imbalance between the front shock and the rear shock.

3. The system of claim 1, wherein the indicator comprises a recommendation how to adjust the front shock or the rear shock.

4. The system of claim 3, wherein the recommendation indicates a damper setting for the front shock or the rear shock.

5. The system of claim 1, wherein the hardware processor is programmed to output the indicator for presentation on a display to the user.

6. The system of claim 5, wherein the hardware processor is programmed to output the first approximation curve and the second approximation curve for simultaneous presentation on the display to the user.

7. The system of claim 1, wherein the hardware processor is programmed to generate and output the indicator in real-time with generation of the front shock zenith position data and the front shock velocity data by a front shock sensor monitoring the bicycle and generation of the rear shock zenith position data and the rear shock velocity data by a rear shock sensor monitoring the bicycle.

8. The system of claim 1, wherein the hardware processor is programmed to adjust a damping force of the front shock or the rear shock responsive to the indicator.

9. The system of claim 1, wherein the front shock zenith position data is representative of a vertical displacement of the front shock over time, and the front shock velocity data is representative of a vertical component of velocity of the front shock over time.

10. A method for configuring a damping force on a suspension system of a bicycle, the method comprising:
storing, by a memory device, front shock zenith position data, front shock velocity data, rear shock zenith position data, and rear shock velocity data for a bicycle, the bicycle comprising a front shock and a rear shock,
wherein the front shock zenith position data and the front shock velocity data are representative of movement of the front shock over time, and the rear shock zenith position data and the rear shock velocity data are representative of movement of the rear shock over time;
generating, by a hardware processor, a first approximation curve by curve fitting the front shock zenith position data and the front shock velocity data;
generating, by the hardware processor, a second approximation curve by curve fitting the rear shock zenith position data and the rear shock velocity data;
generating, by the hardware processor, an indicator that is responsive to a comparison of the first approximation curve and the second approximation curve; and
outputting the indicator for presentation to a user.

11. The method of claim 10, wherein the indicator comprises an indication of an imbalance between the front shock and the rear shock.

12. The method of claim 10, wherein the indicator comprises a recommendation how to adjust the front shock or the rear shock.

13. The method of claim 10, further comprising presenting the indicator on a display to the user.

14. The method of claim 13, further comprising presenting the first approximation curve and the second approximation curve on the display to the user.

15. The method of claim 10, further comprising adjusting, by the hardware processor, a damping force of the front shock or the rear shock responsive to the indicator.

16. The method of claim 10, wherein the front shock zenith position data is representative of a vertical displacement of the front shock over time, and the front shock velocity data is representative of a vertical component of velocity of the front shock over time.

17. Non-transitory physical computer storage comprising computer-executable instructions stored thereon that, when executed by one or more processors, are configured to implement a process for configuring a damping force on a suspension system of a bicycle, the process comprising:
generating a first approximation curve by curve fitting front shock zenith position data and front shock velocity data for a front shock of the bicycle,
wherein the front shock zenith position data and the front shock velocity data are representative of movement of the front shock over time;
generating a second approximation curve by curve fitting rear shock zenith position data and rear shock velocity data for a rear shock of the bicycle,
wherein the rear shock zenith position data and the rear shock velocity data are representative of movement of the rear shock over time;
generating an indicator that is responsive to a comparison of the first approximation curve and the second approximation curve; and
outputting the indicator for presentation to a user.

18. The non-transitory physical computer storage of claim 17, wherein the indicator comprises an indication of an imbalance between the front shock and the rear shock.

19. The non-transitory physical computer storage of claim 17, wherein the indicator comprises a recommendation how to adjust the front shock or the rear shock.

* * * * *